United States Patent [19]

Chulada et al.

[11] Patent Number: 4,516,302

[45] Date of Patent: May 14, 1985

[54] FIELD REPLACEABLE SCREW CONVEYOR INSERTS

[75] Inventors: Edmund C. Chulada, Londonderry; David A. Nelson, Wilton, both of N.H.

[73] Assignee: Ingersoll-Rand Company, Woodcliff Lake, N.J.

[21] Appl. No.: 523,164

[22] Filed: Aug. 15, 1983

Related U.S. Application Data

[62] Division of Ser. No. 289,042, Jul. 31, 1981, Pat. No. 4,419,090.

[51] Int. Cl.[3] ........................ B21K 3/04; B23P 15/02; B23P 15/04

[52] U.S. Cl. ............................ 29/156.8 R; 29/402.13; 29/402.16; 29/416; 29/456; 29/458

[58] Field of Search .................. 29/412, 416, 156.8 R, 29/456, 402.13, 402.16, 458, 460; 198/676; 366/64; 494/53, 54

[56] References Cited

U.S. PATENT DOCUMENTS

| | | | |
|---|---|---|---|
| 3,485,116 | 12/1969 | Fender | 29/156.8 R X |
| 3,764,062 | 10/1973 | Brautigam | 494/54 |
| 3,937,317 | 2/1976 | Fleury, Jr. | 198/676 |
| 3,977,515 | 8/1976 | Lewoczko | 494/54 |
| 4,003,115 | 1/1977 | Fisher | 29/156.8 R |
| 4,006,855 | 2/1977 | Merzenich | 494/54 |
| 4,328,925 | 5/1982 | Shapiro | 494/54 |
| 4,411,175 | 10/1983 | Takahashi et al. | 29/416 |

OTHER PUBLICATIONS

American Machinist–Arthur Havens–Nov. 13, 1940, pp. 922–923.

*Primary Examiner*—Charlie T. Moon
*Attorney, Agent, or Firm*—F. S. Troidl

[57] ABSTRACT

The apparatus for separating a solid-liquid mixture has a housing with a metal screw conveyor adapted to rotate relative to the housing on a common longitudinal axis. The conveyor has helically-formed flights about its axis. Replaceable inserts are mounted on the entire circumference of the flanks of the flights with each insert having metal secured to the flights and integral wear-resistant material adapted to function as the working surface.

The inserts are formed by first making a metal annular member of the same material as the conveyor flight. The wear-resistant, hard-facing material is then deposited on one radial surface of the metal annular member in a manner to simultaneously form and fuse the wear-resistant, hard-facing material to the annular member. The metal part of the annular member is then machined to proper dimensions and the annular member cut into segmental inserts. The segmental inserts are then mounted on the conveyor flights.

1 Claim, 4 Drawing Figures

FIELD REPLACEABLE SCREW CONVEYOR INSERTS

This is a division of application Ser. No. 289,042, filed July 31, 1981, now U.S. Pat. No. 4,419,090.

This invention relates to apparatus and methods for separating a solid-liquid mixture such as centrifuge apparatus. More particularly, this invention is an apparatus for separating a solid-liquid mixture which includes replaceable inserts on the flanks of the flights of a screw conveyor.

Several types of solid-liquid mixture separating machines use a screw conveyor. The screw conveyor has flights which are located in a housing with a small clearance between the periphery of the screw conveyor flights and the housing. As the periphery of the screw conveyor flights wears, the clearance relative to the housing increases, and the operating efficiency of the machine is reduced. One method employed to extend the life of the peripheral edge and flank of the flights is disclosed and described in the U.S. Pat. No. 3,764,062 issued Oct. 9, 1973, entitled "Centrifuge Apparatus." This patent discloses a replacement conveyor edge insert assembly which is composed of two preformed, separate parts. One part is preformed sintered tungsten carbide tile. The other separate preformed part is a weldable backing piece to which the preformed tile is attached. The attachment of the tile to the preformed weldable backing piece requires a great deal of expertise because of the necessary, closely-controlled brazing operation involved. This invention provides the art with a new apparatus for separating a solid-liquid mixture and method of making such an apparatus in which a working surface in the form of a segmental insert with a wear-resistant working surface having sufficient ability to resist damage and is integrally formed with and simultaneously fused to a weldable member. The insert thus produced may be installed by the user without the need of specialized technology or tools, special gauges, or subsequent grinding to restore the screw conveyor to its original factory-produced condition.

Briefly described, the invention includes a housing with a metal screw conveyor adapted to rotate relative to the housing on a common longitudinal axis. The conveyor has helically-formed flights about its axis. Replaceable inserts are mounted on the entire circumference of the flanks in the flights. Each insert has metal secured to the flights and integral wear-resistant material adapted to function as the working surface.

My new method of forming inserts for placement on the outer edges of conveyor flights comprises making a metal annular member of the same material as the conveyor flights. A wear-resistant, hard-facing material is then deposited on one radial surface of the annular member in a manner to simultaneously form and fuse the wear-resistant, hard-facing material to the annular member. The metal part of the annular member is machined to the proper dimensions. The annular member is then cut into a plurality of segmental inserts which are then mounted on the conveyor flights.

The invention, as well as its many advantages, may be further understood by reference to the following detailed description and drawings in which.

In the various figures, like parts are referred to by like numbers.

Figure 1:
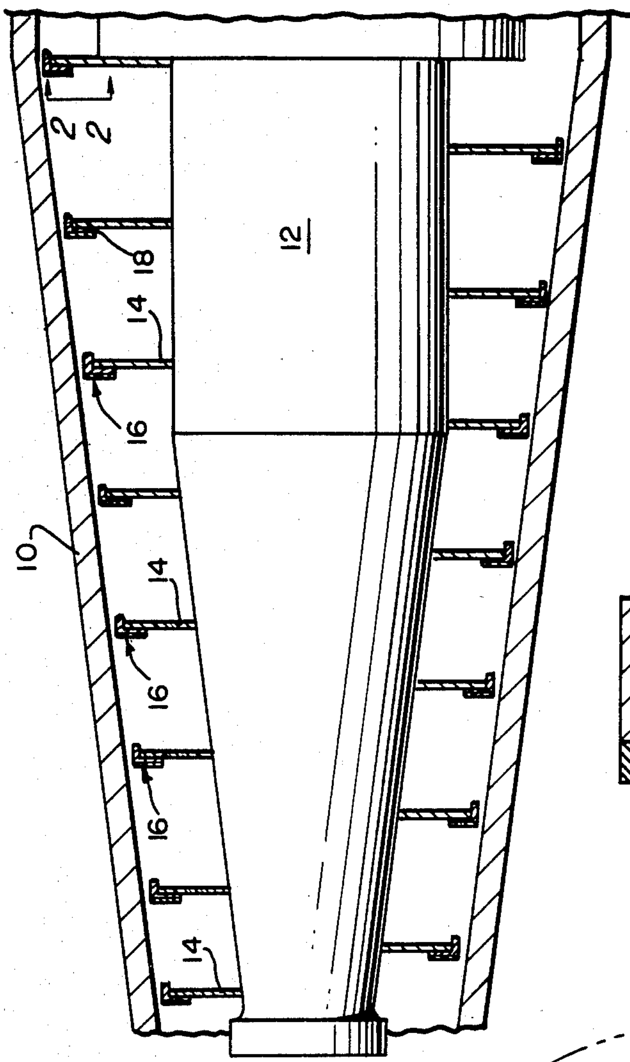
FIG. 1 is a fragmentary, longitudinal sectional view of a centrifuge embodying the invention.

Referring to the drawings, and more particularly to FIG. 1, a part of a centrifuge is shown including a housing 10 in which is coaxially mounted a screw conveyor 12. The conveyor 12 is adapted to be driven at a slight speed differential from that of housing 10 in order to convey solids as a result of this speed differential. Carried on the outer surface of the conveyor 12 are outwardly-projecting, helically-formed screw flights 14. The peripheral edges of the screw flights conform generally to the inner surface of the housing 10 with a small clearance therebetween. The peripheral and flanks of the flights 14 are the working surfaces of the conveyor which come into contact with settled solids resulting from centrifugal action and the rotational movement of the conveyor 12 relative to the housing 10 conveys the settled solids toward the solid discharge opening (not shown).

As the periphery of the screw conveyor flights 14 wears, the clearance relative to the housing increases and the efficiency of the machine is reduced. To extend the life of the peripheral edge and flank of the flights 14, a plurality of replaceable inserts 16 are mounted on the entire circumference of the flanks 18 of the flights 14.

Figure 3:
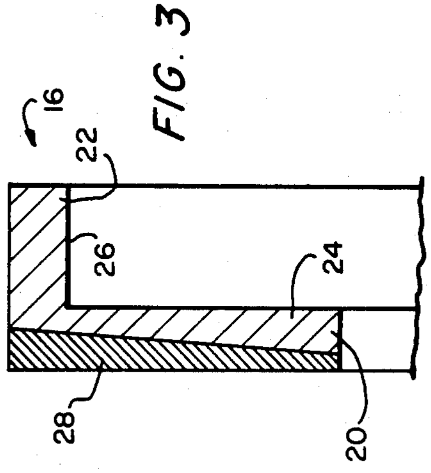
FIG. 3 is a sectional view, on an enlarged scale, through one of the replaceable inserts of FIG. 1.

Referring to FIG. 3, each replaceable insert 16 has a radially-extending portion 20 and a longitudinally-extending lip 22. When the replaceable inserts 16 are secured to the flights 14 (see FIG. 1), a radial surface 24 of the replaceable insert 16 extends radially along the flank 18 of the flights 14. The lips 22 of replaceable inserts 16 extend over and across the peripheral edge of the flights 14.

The surface 26 of the lip 22 is metal and secured to the periphery of the flight 14. The surface 24 is also metal and is secured to the flank 18 of the flight 14. A wear-resistant material 28 extends radially along the working surface side of the replaceable inserts 16 and functions as a working surface.

Figure 4:
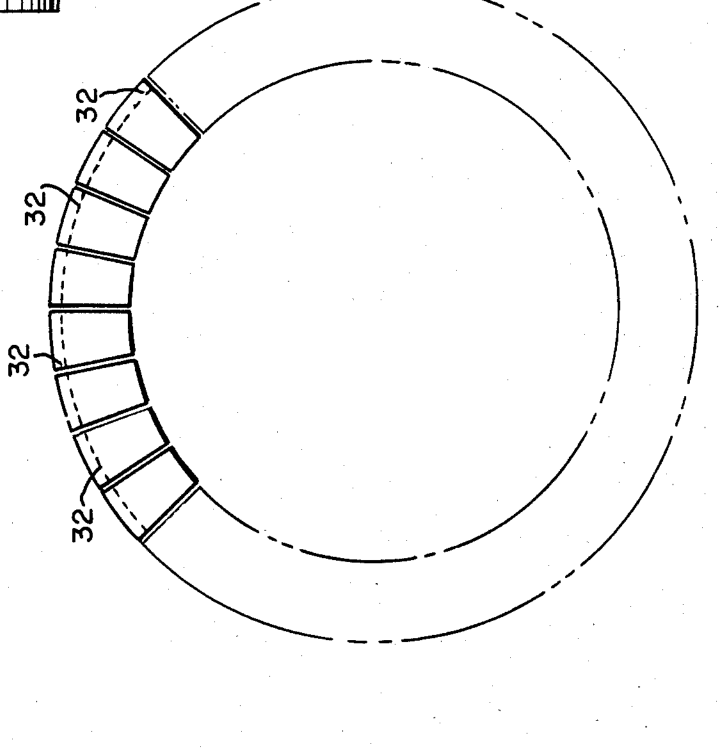
FIG. 4 is a plan view illustrating the method of making the replaceable inserts.

Referring to FIG. 4, the inserts are formed by first making a metal annular member 30 of the same material as the conveyor flights 14. Usually before the premachining operation the annular members are rings having the same thickness throughout the radius of the rings. The working surface of the ring is then premachined. Selection of the wear-resistant, hard-facing material is dependent upon the abrasive and corrosive nature of the solid-liquid mixture, and the cost of application. Examples of such materials are: (a) a Cobalt-base alloy containing principally chromium, tungsten, nickel, iron, carbon, with traces of other elements; (b) a nickel-base alloy containing principally chronium, boron, silicon, iron and carbon; (c) a mixture of up to 60% by weight of tungsten carbide particles and the balance being a Cobalt-base or nickel-base alloy as above. The wear-resistant, hard-facing material 28 is then deposited upon the premachined surface by methods such as a plasma transferred arc automtaic welding process. In this manner, the wearing surface is simultaneously formed and fused to the weldable base material. The non-working surface of the ring is then machined to the proper dimensions and shape shown in FIG. 3 to suit the radius of curvature of the helical flights 14 of the conveyor 12. Then as shown in FIG. 4, the ring 30 is cut into a sufficient number of segments 32 to achieve a reasonable conformity of the flat interface 24 of the resulting replaceable inserts 16 with the warped screw surface of the flank 18 of the conveyor flights 14. The segmental inserts thus formed are positioned on the conveyor flights 14 and welded in place.

For replacement of the inserts in the field, the worn-out inserts are removed from the conveyor flights by grinding-off the attaching weld, dressing the flights as required, the reattaching new inserts. The locating machined periphery of the conveyor flights is protected by the lip 22 of the inserts so that new inserts are able to be accurately attached within allowable tolerances.

Figure 2:
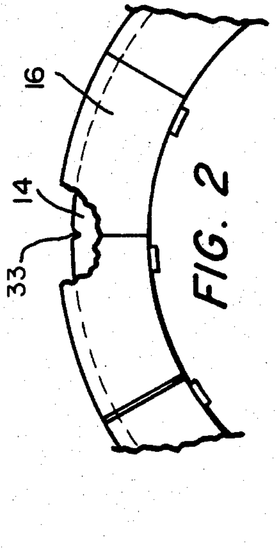
FIG. 2 is a fragmentary view taken generally along lines 2—2 of FIG. 1 and in the direction of the arrows, with a portion of the inserts broken away for clarity.

As shown in FIG. 2, each flight 14 is provided with a notch 33. When the inserts 16 are attached to the flight, two of the inserts have contacting edges radially aligned with notch 33 to properly locate the inserts on on flight.

What is claimed is:

1. A method of forming replaceable inserts for placement on the outer edges of conveyor helical flights comprising: making a metal ring-shaped annular member of the same material as the conveyor flights, depositing wear-resistant, hard-facing material on one radial surface of said annular member in a manner to simultaneously form and fuse the wear-resistant, hard-facing material to the annular member; machining the metal part of the annular member to the proper dimensions; radially cutting the machined annular member into a plurality of segmental inserts; and mounting the segmental inserts on the periphery of the feed-side conveyor helical flights with the radially cut sides of the segmental inserts adjacent each other.

* * * * *